United States Patent
Saas et al.

(10) Patent No.: US 9,508,035 B2
(45) Date of Patent: Nov. 29, 2016

(54) SMART CARD

(71) Applicant: Infineon Technologies AG, Neubiberg (DE)

(72) Inventors: Christoph Saas, Munich (DE); Albert Missoni, Graz (AT); Philip Teichmann, Landsberg am Lech (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/259,182

(22) Filed: Apr. 23, 2014

(65) Prior Publication Data

US 2014/0319228 A1 Oct. 30, 2014

(30) Foreign Application Priority Data

Apr. 24, 2013 (DE) .................. 10 2013 104 142

(51) Int. Cl.
| | |
|---|---|
| G06K 7/08 | (2006.01) |
| G06K 19/06 | (2006.01) |
| G06K 19/073 | (2006.01) |
| G06K 19/07 | (2006.01) |

(52) U.S. Cl.
CPC ......... G06K 19/073 (2013.01); G06K 19/0715 (2013.01)

(58) Field of Classification Search
USPC ................................................. 235/451, 492
See application file for complete search history.

(56) References Cited

U.S. PATENT DOCUMENTS

| | | | | |
|---|---|---|---|---|
| 4,767,918 A | * | 8/1988 | Kushima et al. ............. | 235/441 |
| 5,105,074 A | * | 4/1992 | Nara ............................. | 235/492 |
| 5,828,329 A | * | 10/1998 | Burns .......................... | 341/155 |
| 5,900,782 A | * | 5/1999 | Igarashi et al. .............. | 330/254 |
| 6,128,744 A | * | 10/2000 | Wang ........................... | 713/300 |
| 6,223,990 B1 | | 5/2001 | Kamei | |
| 6,234,898 B1 | * | 5/2001 | Belamant et al. ............. | 463/25 |
| 6,316,968 B1 | * | 11/2001 | Gorman ............. | G11C 11/5621 |
| | | | | 327/53 |
| 6,323,728 B1 | | 11/2001 | Schmitt-Landsiedel et al. | |
| 6,661,215 B2 | | 12/2003 | Asami | |
| 6,694,399 B1 | * | 2/2004 | Leydier ................ | G06F 13/385 |
| | | | | 235/492 |
| 7,129,683 B2 | | 10/2006 | Haider et al. | |
| 7,557,625 B1 | * | 7/2009 | Bazes .................. | H03L 7/0895 |
| | | | | 327/148 |
| 7,912,430 B2 | | 3/2011 | Kargl et al. | |
| 2001/0026177 A1 | * | 10/2001 | Iliasevitch ........... | H03K 17/603 |
| | | | | 327/109 |
| 2001/0035461 A1 | * | 11/2001 | Sedlak ............... | G06K 19/0723 |
| | | | | 235/492 |
| 2002/0060537 A1 | * | 5/2002 | Lee .................... | H05B 41/3921 |
| | | | | 315/224 |
| 2003/0086278 A1 | | 5/2003 | Asami | |
| 2004/0155530 A1 | | 8/2004 | Sedlak et al. | |
| 2005/0030809 A1 | * | 2/2005 | Vimercati ............. | G11C 7/067 |
| | | | | 365/222 |

(Continued)

FOREIGN PATENT DOCUMENTS

| | | |
|---|---|---|
| CN | 1292906 A | 4/2001 |
| CN | 1416100 A | 5/2003 |

(Continued)

OTHER PUBLICATIONS

English abstract for EP 0 977 144 A1 dated Feb. 2, 2000.

(Continued)

*Primary Examiner* — Tuyen K Vo

(57) ABSTRACT

In accordance with various embodiments, a smart card including one or more components to be supplied and a current source, which is configured to provide a supply current with a predefined current intensity to the one or more components to be supplied, is described.

14 Claims, 4 Drawing Sheets

(56) References Cited

U.S. PATENT DOCUMENTS

| | | | |
|---|---|---|---|
| 2006/0266646 A1* | 11/2006 | Kimura | H01C 10/14 |
| | | | 204/425 |
| 2007/0108297 A1* | 5/2007 | Bates | 235/492 |
| 2007/0283415 A1* | 12/2007 | Kurita | 726/2 |
| 2008/0290849 A1* | 11/2008 | Weng et al. | 323/282 |
| 2009/0077393 A1* | 3/2009 | Nakamura | 713/310 |
| 2009/0127934 A1* | 5/2009 | Sbuell et al. | 307/66 |
| 2009/0174392 A1* | 7/2009 | Kadner | G05F 3/30 |
| | | | 324/76.11 |
| 2010/0264982 A1* | 10/2010 | Barcarolo et al. | 327/538 |
| 2011/0127921 A1* | 6/2011 | Lin | H05B 33/0827 |
| | | | 315/192 |
| 2012/0054521 A1* | 3/2012 | Naffziger | 713/322 |

FOREIGN PATENT DOCUMENTS

| | | |
|---|---|---|
| CN | 102103387 A | 6/2011 |
| DE | 102006048594 A1 | 4/2008 |
| DE | 69637439 T2 | 3/2009 |
| EP | 0977144 A1 | 2/2000 |
| EP | 1386218 B1 | 12/2004 |

OTHER PUBLICATIONS

German Office Action dated Jul. 8, 2014.

* cited by examiner ns text content:

SMART CARD

CROSS-REFERENCE TO RELATED APPLICATION

This application claims priority to German Patent Application Serial No. 10 2013 104 142.6, which was filed Apr. 24, 2013, and is incorporated herein by reference in its entirety.

TECHNICAL FIELD

Various embodiments relate generally to smart cards.

BACKGROUND

In accordance with the specification, a SIM (Subscriber Identity Module) card typically should only consume a given maximum current depending on different operational parameters. Typically, the operating current of a SIM card is very dependent on the operations implemented by the SIM card, however, and, in some scenarios, can be above the permissible limits. Correspondingly, efficient measures are desirable for limiting the current consumption without reducing the performance in operating states with a relatively low current consumption.

SUMMARY

In accordance with various embodiments, a smart card including one or more components to be supplied and a current source, which is configured to provide a supply current with a predefined current intensity to the one or more components to be supplied, is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
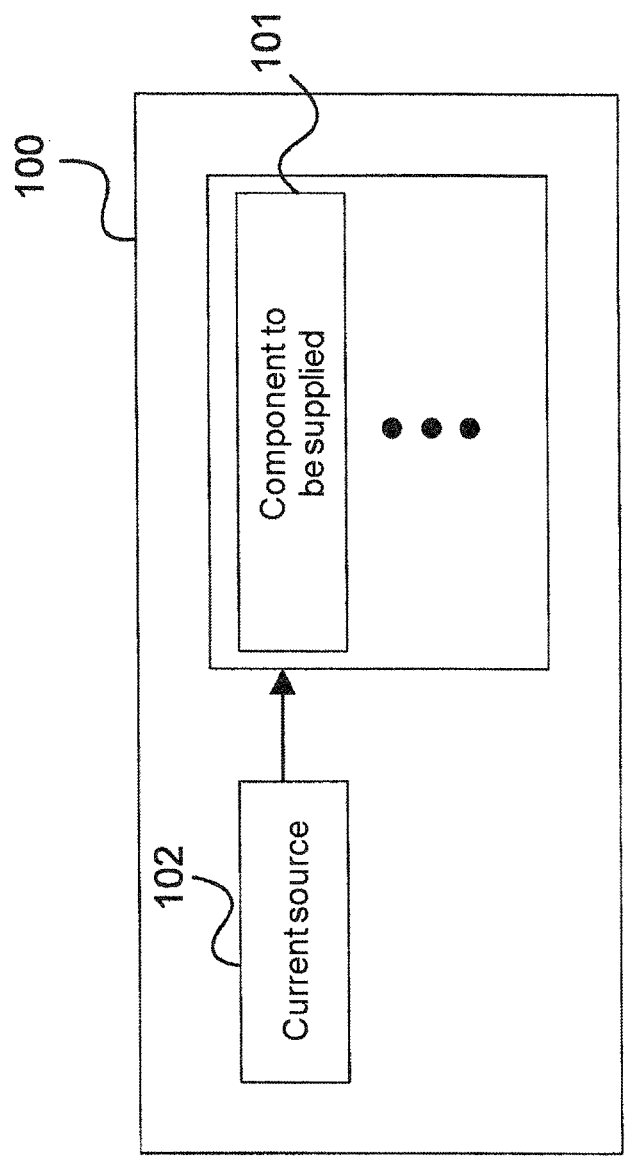
FIG. 1 shows a smart card.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

By virtue of measures in programming, for example by introducing operations with low power loss levels (for example NOP) or possibly temporarily (quasi-)statically reducing the system frequency, the current consumption of a smart card can be kept below a permitted limit. For this, however, increased complexity for the programming of the smart card is required. In addition, typically a comparatively large safety distance from the permitted current needs to be maintained, with the result that the performance is lower than is actually possible.

An integrated automatism may also be provided which suppresses the system clock when the present current consumption exceeds an adjusted threshold. This can be achieved with a control loop with an integrative response with a relevant time constant, which typically has a significant dead time owing to the required synchronization. In this case, the time constant can be selected such that small infringements of the current limit are not corrected in order to ensure a high performance of the system. For short time constants, the integration quickly enters saturation, with the result that suppressed clocks are not completely taken into consideration and therefore, on average, too many clocks are suppressed. With a long time constant, the mechanism is very well suited for setting a mean current value.

However, the correction takes place periodically, owing to the dead time and the large degree of nonlinearity of the controlled variable, with the result that there are regular overshoots. Furthermore, the correction of severe load changes is also performed with an appropriately long delay, with the result that the specification can be adhered to in respect of the duration of permitted overshoots only with difficulty.

The clock packets arising owing to the control loop produce high load changes in the system which can be corrected only with difficulty.

A smart card with an energy supply to a component to be supplied which makes it possible to use a quick-response control loop in order to ensure voltage and current in the required range is described below.

FIG. 1 shows a smart card 100.

The smart card 100 has one or more components 101 to be supplied.

In addition, the smart card 100 has a current source 102, which is configured to provide a supply current with a predefined current intensity to the one or more components to be supplied.

In various embodiments, in other words, the current which is made available to a set of components to be supplied is fixed at a predefined value (for example a value which is permissible in accordance with a specification). In the case of a plurality of components to be supplied, each of the components to be supplied consumes some of the supply current, for example, with the result that, in total, a supply current with the predefined current intensity is fed to the components to be supplied. A component to be supplied is, for example, an internal consumer of the smart card, such as a logic circuit, for example.

By way of example, a series regulator (for energy supply) is provided in an operating state in which it effects limitation of the current available. Functionalities for the current limitation can be used to ensure a reliably operating system (for example correct operation of the component to be supplied). This operating state is achieved by virtue of the fact that the series regulator is operated as current source. For example, the working point of the current source is set via a scaled copy of a regulating transistor and a current reference. By means of this current reference, the desired value for the supply current can be set for a component to be supplied. In this case, an additional component of the total current of further regulators and components to be supplied can be taken into consideration, if appropriate.

The smart card has, for example, a reference current source, wherein the predefined current intensity is predefined by the current intensity of the reference current source.

The temperature dependence of the current intensity of the reference current source can be set, for example.

The smart card may also have a memory, which is configured to store a value, by means of which the predefined current intensity is predefined.

In accordance with various embodiments, the smart card has a regulator, which is configured to regulate the supply current to the predefined current intensity.

In accordance with various embodiments, the smart card has a regulator, which is configured to control a component to be supplied of the one or more components to be supplied in such a way that a voltage between two nodes of the component to be supplied is above a predetermined threshold value or the voltage is between two predetermined threshold values.

For example, the two nodes are an energy supply input node for a high supply potential and an energy supply input node for a low supply potential of the component to be supplied.

The two nodes can also be two internal nodes of the component to be supplied.

The regulator is configured, for example, to regulate the voltage by controlling a clock signal, which is fed to the component to be supplied.

The regulator is configured, for example, to reduce the number of clocks of the clock signal per unit time when the voltage is below the predetermined threshold value.

The regulator may be configured, for example, to suppress clocks of the clock signal when the voltage is below the predetermined threshold value.

In accordance with various embodiments, the current source has a current mirror, which is configured to provide the supply current by mirroring a reference current.

The one or more components to be supplied are, for example, a plurality of components to be supplied, and the current source is configured, for example, to feed a supply current to each of the components to be supplied, with the result that the sum of the current intensities of the supply currents is equal to the predefined current intensity.

The predefined current intensity can be set, for example.

In accordance with various embodiments, the smart card has a regulator, which is operated as a current source and regulates the voltage at the one or more components to be supplied (by suitable measures).

Examples will be described in more detail below.

In accordance with various embodiments, the integration of the discrepancy between the operating current (supply current) and its setpoint value is performed directly on the capacitance between ground and the supply voltage. In accordance with various embodiments, a series regulator is operated as current source, with the result that a substantially constant current consumption of the component to be supplied results on the outside. For the internal circuit of the component to be supplied, therefore, there is an enforced lack of current as soon as the current consumption of said component to be supplied exceeds the predetermined value. The change in current consumption of the component to be supplied therefore results in a varying internal voltage. For example, an undervoltage protection means is used to ensure that the internal operating voltage does not fall below a defined minimum. For example, if the voltage undershoots a defined threshold value, an oscillator which provides a clock signal for the component to be supplied is stopped synchronously. As soon as the internal supply voltage has reached a sufficiently high value again, the oscillator is reactivated asynchronously and a system clock generated.

Figure 2:
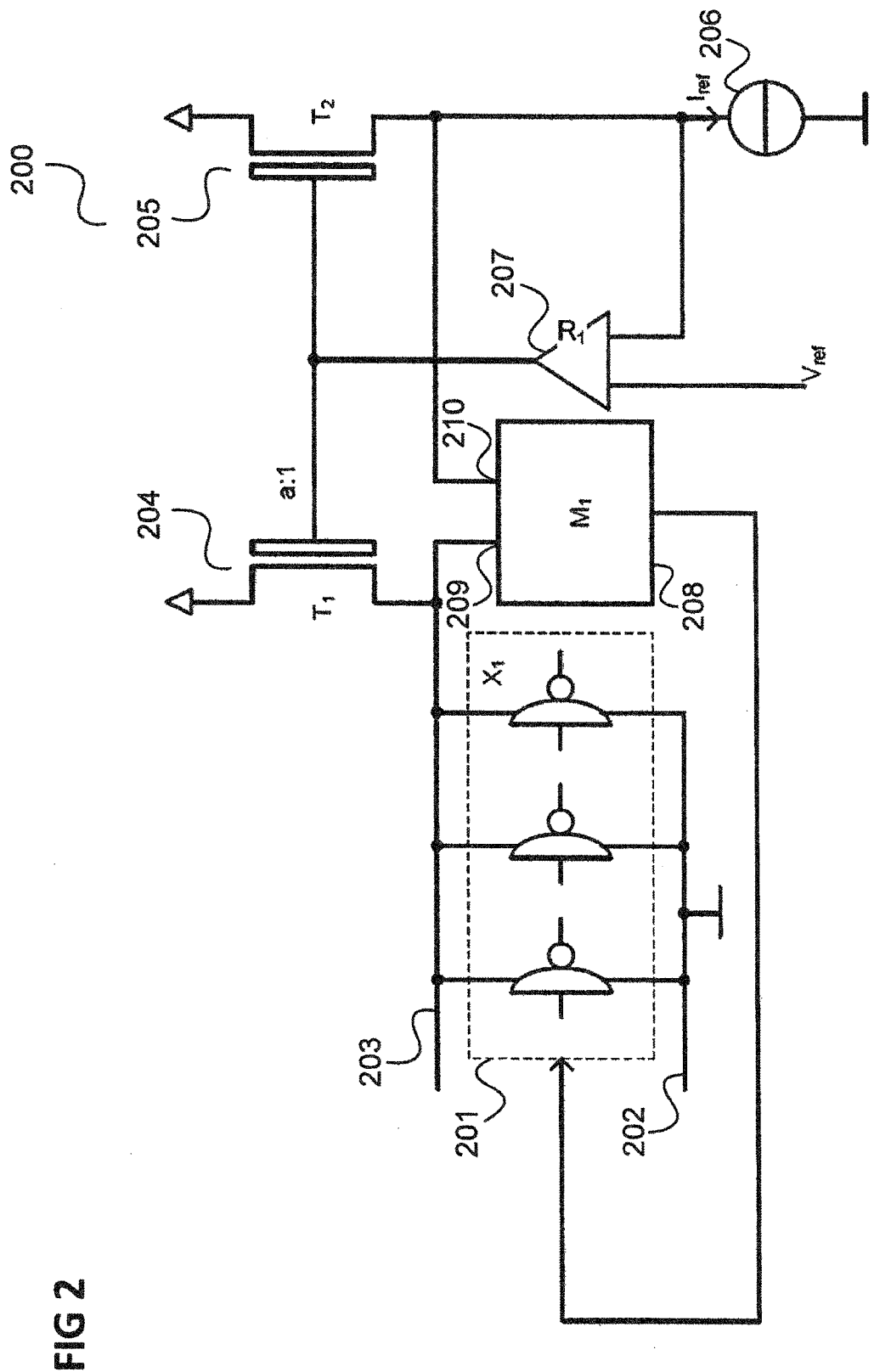
FIG. 2 shows a supply circuit in accordance with various embodiments.

FIG. 2 shows a supply circuit 200.

The supply circuit 200 is arranged, for example, on a smart card and is used for supplying energy to a component 201 to be supplied.

The component 201 to be supplied is connected to ground (or VSS) via a first energy supply node 202 and is supplied with current via a second energy supply node 203.

The second energy supply node 203 is connected to the source connection of a first n-channel transistor 204, whose drain connection is connected to an external supply potential and whose gate connection is connected to the gate connection of a second re-channel transistor 205. The drain connection of the second n-channel transistor 205 is connected to the supply potential.

A reference current source 206 is arranged between the source connection of the second n-channel transistor 205 and ground. The source connection of the second n-channel transistor 205 is also connected to an input of an operational amplifier 207. A reference voltage is fed to the operational amplifier 207 via a second input. The output of the operational amplifier 207 is connected to the gate connections of the n-channel transistors 204, 205.

A first input 209 of a regulator 208 is connected to the source connection of the first n-channel transistor 204, and a second input 210 of the regulator 208 is connected to the source connection of the second n-channel transistor 205. The output 211 of the regulator 208 is connected to the component to be supplied for feeding a control signal.

The gate voltage of the n-channel transistors 204, 205 is set by means of the operational amplifier 207 in such a way that the source potential of the second n-channel transistor 205 corresponds to the reference voltage applied to the operational amplifier 207.

The current flowing through the second n-channel transistor 205 is defined by the reference current. Assuming that the source potential of the n-channel transistors 204, 205 is identical, these transistors operate as current mirror. The first n-channel transistor 204 therefore makes available a multiple of the reference current, said multiple being defined via the mirror factor of the current mirror a (for example a=1000) to the component 201 to be supplied.

If the nominal consumption of the component 201 to be supplied overshoots the current available, the potential at the second energy supply node 203 (i.e. the voltage at the component 201 to be supplied) drops. The regulator 208 ensures, by means of suitable measures, that the current consumption of the component to be supplied is set precisely such that the source potentials of the n-channel transistors 204, 205 are identical. The assumption that the source potentials are identical is therefore justified.

Since the consumption of the entire system is dominated by the current flow through the first n-channel transistor 204, the total current can therefore be set substantially via the reference current.

The regulator 208 can reduce the current consumption of the component 201 to be supplied by suppressing system or oscillator clocks and thus keep the source potentials at the same value (referred to below as variant 1).

The regulator 208 can be in the form of a comparator between the nodes source connections of the n-channel transistors (variant 2).

Figure 3:
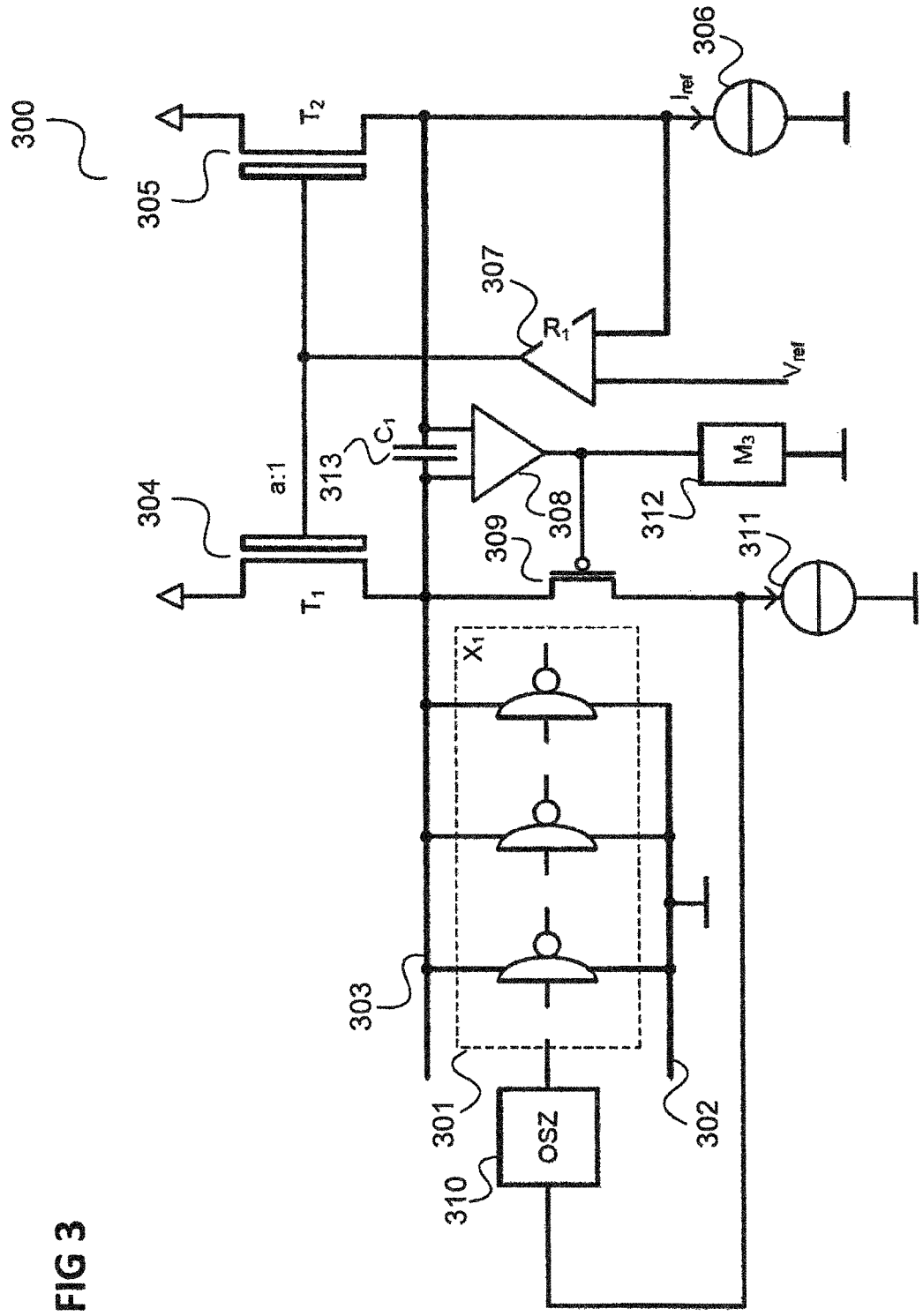
FIG. 3 shows a supply circuit in accordance with various embodiments.

One example for implementing the regulator 208 as a comparator is illustrated in FIG. 3.

FIG. 3 shows a supply circuit 300.

The supply circuit 300 has, analogously to the supply circuit 200, a component 301 to be supplied, energy supply nodes 302, 303, n-channel transistors 304, 305, a reference current source 306 and an operational amplifier 307.

In this example, the regulator 208 is implemented as follows. The two inputs of a second operational amplifier 308 are connected to the source connection of the first n-channel transistor 304 and the source connection of the second n-channel transistor 305, respectively.

The output of the second operational amplifier 308 is connected to the gate connection of a p-channel transistor 309, whose source connection is connected to the source connection of the first n-channel transistor 304 and whose drain connection represents the output of the regulator, wherein the corresponding control signal in this example controls an oscillator 310, which provides a clock signal to the component 301 to be supplied.

A working point current source 311 is connected between the drain connection of the p-channel transistor 309 and ground. In addition, a control circuit 312 is provided between the operational amplifier 308 and ground.

In this example, the regulator is in the form of a current branch with a working point current (provided by the working point current source 311). The regulator controls the potential of the gate of the p-channel transistor 309 in such a way that the source potentials of the n-channel transistors 304, 305 are identical (variant 3a).

Therefore, both a quick response time for the suppression of clocks of the clock signal provided by the oscillator 310 and precise balancing of the source potentials can be realized. In various embodiments, a correspondence of the node potentials on average can be achieved.

The control circuit 312 can additionally be provided to limit the potential of the gate of the p-channel transistor 309 in the case of a current consumption of the component to be supplied below the value set by the reference current to a predefined minimum (variant 3b).

A capacitance 313 may additionally be provided, which ensures dynamic coupling of the source connections of the n-channel transistors 304, 305 (variant 3c). Since the current through the n-channel transistors has a nonlinear dependence on the respective source potentials, correspondence between the source potentials which is as accurate as possible at any point in time is necessary for precise current regulation.

In various embodiments, the smart card has a plurality of voltage domains to be supplied (each having one or more components to be supplied), in which a temporally variable, relevant current consumption exists.

It will be assumed below that the component to be supplied belongs to a first voltage domain and the sum of the current consumption in all of the other voltage domains does not exceed the maximum permissible value.

Figure 4:
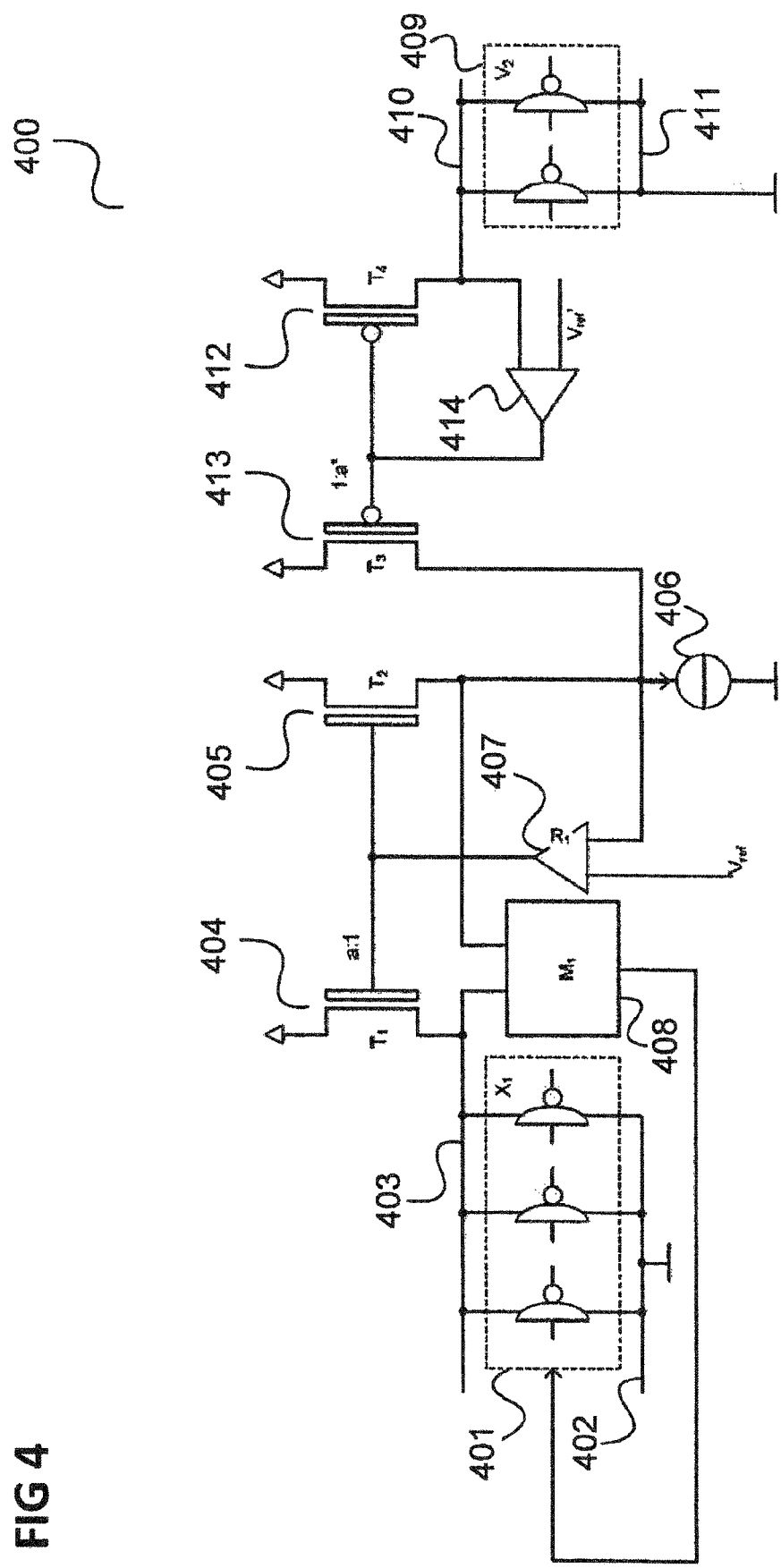
FIG. 4 shows a supply circuit in accordance with various embodiments.

FIG. 4 illustrates a supply circuit in which a weighted mirroring-out of the supply currents for (in this example) a further voltage domain at the summation node (source connection of the second n-channel transistor 205) is subtracted and is thus taken into consideration when setting the working point of the first n-channel transistor 204.

FIG. 4 shows a supply circuit 400.

The supply circuit 400 has, analogously to the supply circuit 200, a component 401 to be supplied, an energy supply node 402, 403, n-channel transistors 404, 405, a reference current source 406, an operational amplifier 407 and a regulator 408.

It is assumed that the component 401 to be supplied belongs to a first voltage domain and that the smart card in this example has a second voltage domain with a second component 409 to be supplied.

Similarly to the first component 401 to be supplied, the second component to be supplied has a first energy supply node 411, which is connected to ground, and a second energy supply node 412.

The second energy supply node 412 is coupled to the drain connection of a first p-channel transistor 412, whose source connection is coupled to the supply potential and whose gate connection is coupled to the gate connection of a second p-channel transistor 413. The source connection of the second p-channel transistor 413 is coupled to the source connection of the second n-channel transistor 405. The corresponding connecting node is also referred to as sum node.

A second operational amplifier 414 is connected at one input to the drain connection of the first p-channel transistor 412 and receives a second reference voltage via the second input. The output of the second operational amplifier 414 is connected to the gate connections of the p-channel transistors 412, 413.

If the current consumption in the further voltage domain is virtually constant, this can be considered to be the derivative action (for example in the case of the reference current source 206). It is then possible to dispense with summation such as in the case of the supply circuit 400 at the sum node.

As shown in FIG. 4, the series regulating transistor for the additional voltage domain can be a p-channel transistor 412 (variant 5). Alternatively, an n-channel transistor may be used.

In all embodiments, for example, pMOS transistors and nMOS transistors may be used as the p-channel transistors and n-channel transistors, respectively. Alternatively, any type of transistors can be used. In general, any type of elements may be used in which the resistance or the current flow can be controlled.

The mirroring-out is performed in the case of the supplied circuit 400 for the further voltage domains in a manner equivalent to the mirroring-out for the first voltage domain with a mirror factor a'. For the case where a≠a', this difference can be compensated for at another point.

The drain voltage of the second p-channel transistor 413 (coupling-out transistor) may be cascoded in order to minimize the mirror error as a result of the finite output resistance of the p-channel transistors 412, 413 (variant 6).

The current subtraction at the sum node may be weighted and possibly adjusted in a chip-individual manner in order to compensate for any mismatching (variant 7).

The weighting can be realized by additional remirroring (variant 8), possibly with a cascode.

In various embodiments, the smart card has a plurality of voltage domains to be supplied (each having one or more components to be supplied), in which a temporally variable, relevant current consumption exists, wherein (in contrast to the example shown in FIG. 4) it is assumed that the component 201 to be supplied belongs to a first voltage domain and the sum of the current consumption in all of the other voltage domains can at least temporarily exceed the permissible maximum value.

In this case, further regulators can be provided which, by means of suitable measures, reduce current consumptions arising in the additional domains (variant 9). These regulators can be implemented similarly to the regulator 208 and resort to similar measures in the further voltage domains (for example clock suppression).

The intensity of the reference current which is provided by the reference current source 206 can be set such that different maximum permissible supply currents can be reached (variant 10).

The intensity of the reference current which is provided by the reference current source 206 may be adjustable, for example, in a chip-individual manner, for example in order to compensate for errors (variant 11).

The intensity of the reference current which is provided by the reference current source 206 may be adjustable in terms of its temperature dependence (for example in a chip-individual manner) (variant 12), with the result that, for example, a compromise between the performance over temperature and the adjustment derivative action may be found.

The adjustment of the temperature dependence can be performed, for example, by adjustably mixing a reference current with positive temperature dependence (PTAT reference current=proportional to absolute temperature reference current) reference current with a negative temperature dependence (NTAT reference current "negatively proportional to absolute temperature") (variant 13).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A smart card, comprising:
    one or more components to be supplied;
    a current source configured to provide a supply current by mirroring a reference current, wherein the current source is further configured to provide the supply current with a predefined current intensity to one or more components to be supplied;
    a regulator, which is configured to control a component to be supplied of the one or more components in such a way that a voltage between two nodes of the component to be supplied of the one or more components is above a predetermined threshold value or is between two predetermined threshold values; and
    an oscillator configured to provide a clock signal to the component to be supplied of the one or more components;
    wherein an output of the regulator is configured to control the oscillator.

2. The smart card of claim 1, further comprising:
    a reference current source having a current intensity;
    wherein the predefined current intensity is predefined by the current intensity of the reference current source.

3. The smart card of claim 2,
    wherein a temperature dependence of the current intensity of the reference current source can be set.

4. The smart card of claim 1, further comprising:
    a memory, which is configured to store a predefined current intensity value.

5. The smart card of claim 1, wherein
    the regulator is configured to regulate the supply current to the predefined current intensity.

6. The smart card of claim 1,
    wherein the two nodes are an energy supply input node for a high supply potential and an energy supply input node for a low supply potential of the component to be supplied.

7. The smart card of claim 1,
    wherein the two nodes are two internal nodes of the component to be supplied.

8. The smart card of claim 1,
    wherein the regulator is configured to reduce the number of clocks of the clock signal per unit time when the voltage is below the predetermined threshold value.

9. The smart card of claim 1,
    wherein the regulator is configured to suppress clocks of the clock signal when the voltage is below the predetermined threshold value.

10. The smart card of claim 1, further comprising:
    a regulator, which is operated as the current source and regulates the voltage at the one or more components to be supplied.

11. The smart card of claim 1,
    wherein the one or more components to be supplied are a plurality of components to be supplied, and wherein the current source is configured to feed a supply current to each of the components to be supplied, with the result that the sum of the current intensities of the supply currents is equal to the predefined current intensity.

12. The smart card of claim 11,
    wherein the predefined current intensity can be set.

13. The smart card of claim 1, wherein the reference current is arranged between an input of the regulator and ground.

14. The smart card of claim 1, wherein an output of a current mirror feeds into an input of the regulator.

* * * * *